F. O. Matthiessen,

Vacuum Pan.

No. 77,065. Patented Apr. 21, 1868.

Witnesses.
A. Sellers
J. W. Comely

F. O. Matthiessen

United States Patent Office.

FRANZ O. MATTHIESSEN, OF JERSEY CITY, NEW JERSEY.

Letters Patent No. 77,065, dated April 21, 1868.

---

IMPROVED VACUUM-PAN APPARATUS.

---

The Schedule referred to in these Letters Patent and making part of the same.

---

TO ALL WHOM IT MAY CONCERN:

Be it known that I, FRANZ O. MATTHIESSEN, of Jersey City, in the county of Hudson, and State of New Jersey, have invented a new and useful Improvement in Vacuum-Pan Apparatus, of which the following is a full, clear, and exact description, reference being had to the accompanying drawing, forming part of this specification, and in which—

Figure 1:
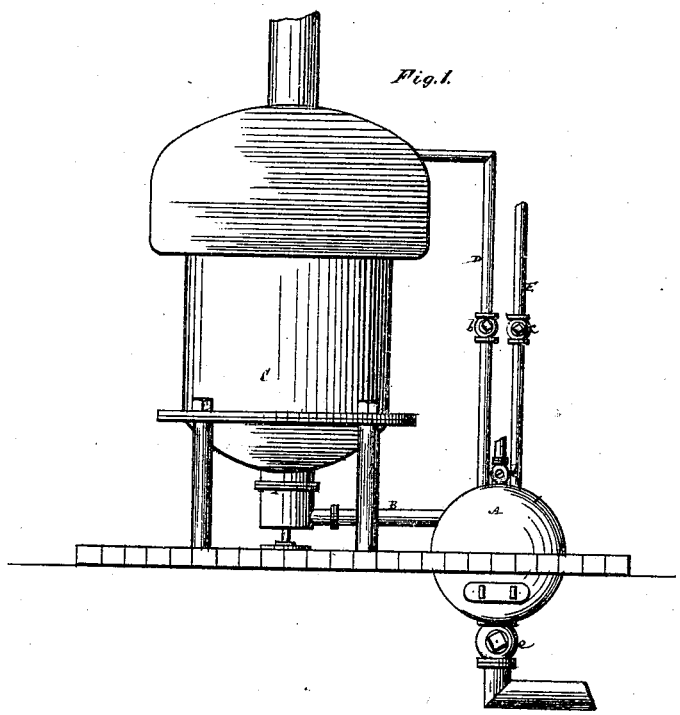
Figure 2:
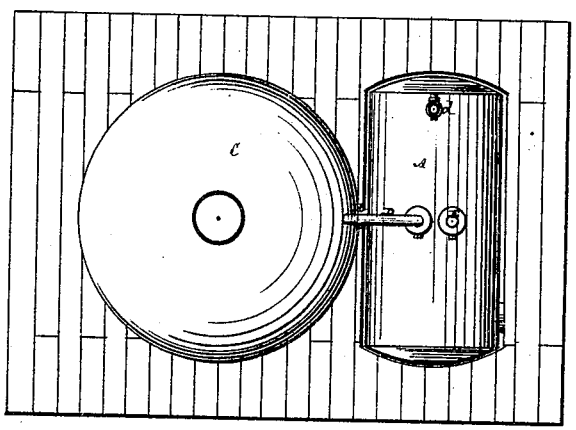

Figure 1 represents a view in elevation of a vacuum-pan, with my improvement as applied or attached thereto, and Figure 2 a plan of the same.

Similar letters of reference indicate corresponding parts.

This my improvement will be best explained by the following prefatory remarks with reference to the ordinary process of working under the vacuum-pan system.

Thus, in boiling sugar or molasses, although it is very desirable in many instances to keep up the process in a continuous or unbroken manner, this is not practicable under the ordinary construction of vacuum-pan, or method of working. It is usual, for instance, under such system, first, to set the air-pump in operation, to create a vacuum in the pan, a cock at the same time being opened to establish communication between the pan and tanks containing the liquid to be boiled, in order that, as soon as the vacuum rises sufficiently, the liquid will, by the pressure of the outside atmosphere upon it, be forced into the pan. After a proper quantity of liquid has been thus supplied to the pan, steam is turned on, and the boiling commenced and continued till the pan is filled. It then becomes necessary to wholly or partly empty the pan of its contents to admit of a second or fresh supply of the liquid from the tanks, to undergo the like process of boiling, and to effect these repeated emptyings each successive boiling, atmospheric air from the outside has to be introduced within the pan by opening a suitable cock or valve, and the contents run off into a vessel by opening a valve in the bottom of the pan, after which, to start the pan for a second boiling, it becomes necessary to commence as anew, by exhausting the vacuum-pan of air, thus causing considerable loss of time, power, and steam on each occasion that the vacuum is destroyed for the purpose of running off a charge as it is boiled.

My improvement has for its object the remedying of this defect, and my invention consists in such a combination of devices with the vacuum-pan proper as that a boiling, or any portion of a boiling, may be run off without destroying the vacuum in the pan, whereby the process of boiling under the vacuum-pan system may be kept up in a continuous or unbroken manner, thereby saving time, labor, and the steam used in boiling the liquid.

In illustration of how this my improvement is or may be carried into practice, A represents an air-tight vessel, which may be of any suitable size and shape, and is in connection, by a pipe, B, with the discharge-pipe from the pan C under control of the usual bottom valve. This vessel A is also connected by a pipe, D, that is controlled by a cock, $b$, with the upper or other suitable part of the pan, so that when the air-pump establishes a vacuum in the pan, it also, by opening the cock $b$, creates a vacuum in the air-tight tank or vessel A, which is likewise provided with a pipe, E, having a cock, $c$, for establishing communication with the, or a separate, air-pump, and is further provided with an air-cock, $d$, discharge-pipe, and cock, $e$, and, it may be, water-gauge, and other of the usual appurtenances to vacuum-pans.

The operation is as follows: The pan C is started in the usual way, but the connection between the air-tight tank or vessel A and pan C is allowed to be open by suitably turning the cock $b$, so that there will be the same range of vacuum in both vessels. After the pan C is filled, the bottom valve to the discharge-outlet from the latter is opened, and the contents of the pan, or any desired portion thereof, run off into the auxiliary air-tight tank A, without interruption to the boiling in the pan. Upon the required quantity of the boiled liquid having been thus discharged from the pan, the bottom valve to the latter is shut, and the cock $b$ also closed, whereby all communication, both above and below, between the auxiliary vessel A and pan C is shut off. Air is then allowed to enter the vessel A by opening the cock $d$, when, on opening the discharge-cock $e$ at the bottom of the vessel A, the contents of the latter can be run off for further treatment, as required, after which the discharge-cock e and air-cock d are again shut, and the air exhausted from the vessel A by opening the cock c, and sucking on the pipe E. This puts the vessel A in condition to have its connection again established with the upper portion of the pan C by the pipe D, which is done by opening the cock b, and stopping, say, at the same time, all further action of the air-pump on the pipe E, and closing the cock c. The apparatus is then ready for a repetition of the drawing-off process, as described, and which may be repeated indefinitely without destroying the vacuum in the pan, or arresting the boiling that is or may be thus made continuous.

By this my improvement, seven pan-charges may be run off in the same time as it takes to discharge six under the ordinary process.

What is here claimed, and desired to be secured by Letters Patent, is—

The combination, with the vacuum-pan, of an auxiliary air-tight tank or vessel, provided with suitable air and discharge-cocks or valves, and having connections under the control of appropriate cocks or valves, with an air-pump, or its equivalent, and with the vacuum-pan, both above and below, for operation in the manner described, and whereby a boiling, or any portion of a boiling, may be run off without destroying the vacuum in the pan, and a continuous boiling therein be kept up, substantially as specified.

F. O. MATTHIESSEN.

Witnesses:
A. LE CLERC,
J. W. COOMBS.